United States Patent
Asakura (10) Patent No.: US 7,355,810 B2
(45) Date of Patent: Apr. 8, 2008

(54) DISK DRIVE HAVING A DISK MEDIUM WITH DISCRETE TRACK

(75) Inventor: Makoto Asakura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 73 days.

(21) Appl. No.: 11/510,657

(22) Filed: Aug. 28, 2006

(65) Prior Publication Data

US 2007/0097540 A1    May 3, 2007

(30) Foreign Application Priority Data

Oct. 27, 2005    (JP)    ............................. 2005-313369

(51) Int. Cl.
*G11B 5/596*    (2006.01)
*G11B 5/09*    (2006.01)

(52) U.S. Cl. ...................... 360/77.08; 360/48

(58) Field of Classification Search ............... None
See application file for complete search history.

(56) References Cited

U.S. PATENT DOCUMENTS 6,961,203 B1 *    11/2005    Baker ................. 360/77.08
6,977,789 B1 *    12/2005    Cloke ................. 360/75
2003/0210491 A1    11/2003    Kuroda et al.
2005/0052767 A1 *    3/2005    Miyata et al. ............ 360/31
2006/0001999 A1 *    1/2006    Ehrlich ................ 360/75

FOREIGN PATENT DOCUMENTS

| JP | 08-221919 | 8/1996 |
| JP | 09-251736 | 9/1997 |
| JP | 2005-100611 | 4/2005 |

* cited by examiner

*Primary Examiner*—Andrew L. Sniezek
(74) *Attorney, Agent, or Firm*—Pillsbury Winthrop Shaw Pittman, LLP (57) ABSTRACT

According to one embodiment, a disk drive using a disk medium in which servo information is embedding-recorded by a DTR method has a structure wherein a phase-difference servo burst pattern included in the servo information embedded in servo regions on the disk medium has a single inclined direction being the same as a direction of an inline angle of a head.

8 Claims, 8 Drawing Sheets

The case of adopting an opposite pattern of Tp_sv cycle

| Inclination period | Tp_sv | 2×Tp_sv | 4×Tp_sv | 8×Tp_sv |
|---|---|---|---|---|
| Detection accuracy | 6.7nm | 0.8nm | 1.5nm | 3.3nm |

Tp_sv represents a servo pitch (cylinder code changing pitch)

FIG. 11

DISK DRIVE HAVING A DISK MEDIUM WITH DISCRETE TRACK

CROSS-REFERENCE TO RELATED APPLICATIONS

This application is based upon and claims the benefit of priority from Japanese Patent Application No. 2005-313369, filed Oct. 27, 2005, the entire contents of which are incorporated herein by reference.

BACKGROUND

1. Field

One embodiment of the present invention generally relates to a disk drive using a magnetic disk medium storing servo information including a phase-difference servo burst pattern, in particular, a disk drive using a magnetic disk medium adopting a discrete track storing method.

2. Description of the Related Art

Generally, in disk drives typified by hard disk drives, servo information necessary for positioning control of a head writing data on a magnetic disk medium (hereinafter simply referred to as "disk medium") and reading data from a magnetic disk is stored in advance on a disk medium. In other words, a disk medium storing servo information is inserted in the disk drive.

Servo information is used for detecting the position of the head. Servo information mainly comprises a cylinder address code for identifying a cylinder (track) position of on a disk medium, and a servo burst pattern for detecting a position in a cylinder. Specifically, servo burst pattern is information for detecting off-track amount (position error) with respect to the center of a cylinder.

As an example of the servo burst pattern, there is phase-difference servo burst pattern adopting a method of detecting phase difference (for example, refer to Jpn. Pat. Appln. KOKAI Publication Nos. 2005-100611 and 8-221919). The phase-difference servo burst patterns disclosed in these documents do not have any special technical meaning with respect to the inclination direction and the angle, and are recorded on a disk medium by magnetic transfer.

In the meantime, recently, disk media having a structure named "discrete track medium (DTM)" (hereinafter referred to as "DTM structure" have received attention. In disk media adopting the DTM structure, regions effective as a magnetic recording section and regions not effective are formed on a surface thereof. The effective regions are projecting magnetic regions provided with a magnetic film. The non-effective regions are non-magnetic regions, or depressed regions where magnetic recording is impossible. Specifically, the non-effective regions include regions that are substantially formed as non-magnetic regions as being depressed, even with a magnetic film.

A disk medium having the above DTM structure is manufactured by a stamper method including a pattern transfer step, and thus can record servo information with high efficiency without using a conventional servo track writer. This recording method is sometimes called "Discrete Track Recording" (DTR). Specifically, adopting the DTR method enables high-accuracy embedded recording of servo information including phase-difference servo burst pattern on a disk medium by a pattern transfer step.

In the above DTR method, it is possible to greatly improve linear recording density, by setting the playback head width by a read head (for example, a GMR head) for reading servo information and user data to be almost the same as the data track pitch width. Data tracks are regions for recording user data, and adjacent to the servo region.

In the meantime, in the case of narrowing the playback head width of the read head with increase in the recording density, the playback head width in the DTR method is almost equal to the data track pitch width, and the cycle of the phase-difference servo burst pattern of the servo information is increased, as described above. Therefore, it is necessary to strictly control the inclination direction and the inclination angle of the phase-difference servo burst pattern. The meaning thereof is explained below.

In disk media having a common uniform magnetic structure other than the DTM structure, when user data is recorded with high density, spread occurs in the transverse direction of the magnetic domain recorded by the write head. To prevent interference with existing data in the adjacent track, a recording width of the write head being 80% or less of the data track pitch is generally adopted. Further, the playback head width is equal to or less than 80% of the write head recording width, for the purpose of playing back a recording signal having the transverse spread with a good S/N ratio. Specifically, drives using disk media having a common uniform magnetic structure adopt a very narrow read head having a playback head width of 64% or less of the data track pitch.

However, in the case of adopting the DTR method, the playback head width of the read head is almost the same as the width of the data track pitch, as described above. In this case, the playback accuracy of the phase-difference servo burst pattern by the read head deteriorates in a certain inclination direction and a certain inclination angle of the phase-difference servo burst pattern included in the servo information, and there is the problem that a sufficient position detection accuracy cannot be obtained for the head.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a disk drive comprises: a magnetic disk medium including servo regions, in which servo information for position detection of a head performing recording and playback of user data is embedding-recorded by discrete track recording method, the servo information including a preamble section, a cylinder address code section, and phase-difference burst pattern sections to detect an offtrack amount, one phase-difference servo burst pattern section being provided in each of the servo regions, a servo burst pattern having an inclined direction corresponding to a direction of an inline angle of the head and a phase which gradually delays toward an internal periphery of the disk medium and gradually advances towards an external periphery of the disk medium; a read head which is included in the head and reads the servo information and the user data from the magnetic disk medium; and control means for performing positioning control of the head in accordance with the servo information played back from the servo regions by using the read head.

Embodiments will be explained below with reference to drawings.

First Embodiment

Figure 1:
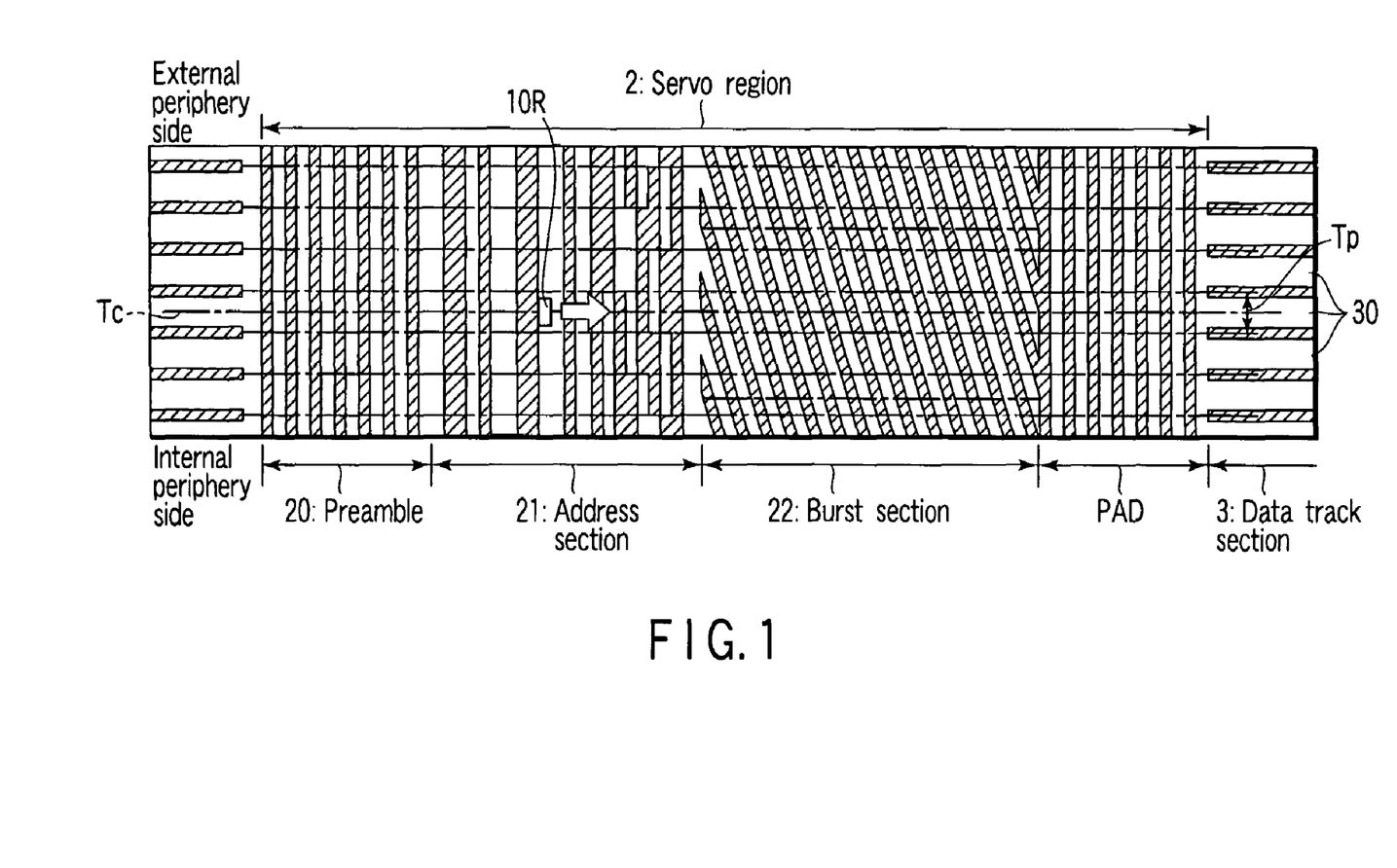
FIG. 1 is a diagram illustrating a structure of a disk medium according to a first embodiment of the present invention.

According to an embodiment, FIG. 1 shows a diagram illustrating a structure of a disk medium.

(Structure of Disk Drive)

Figure 2:
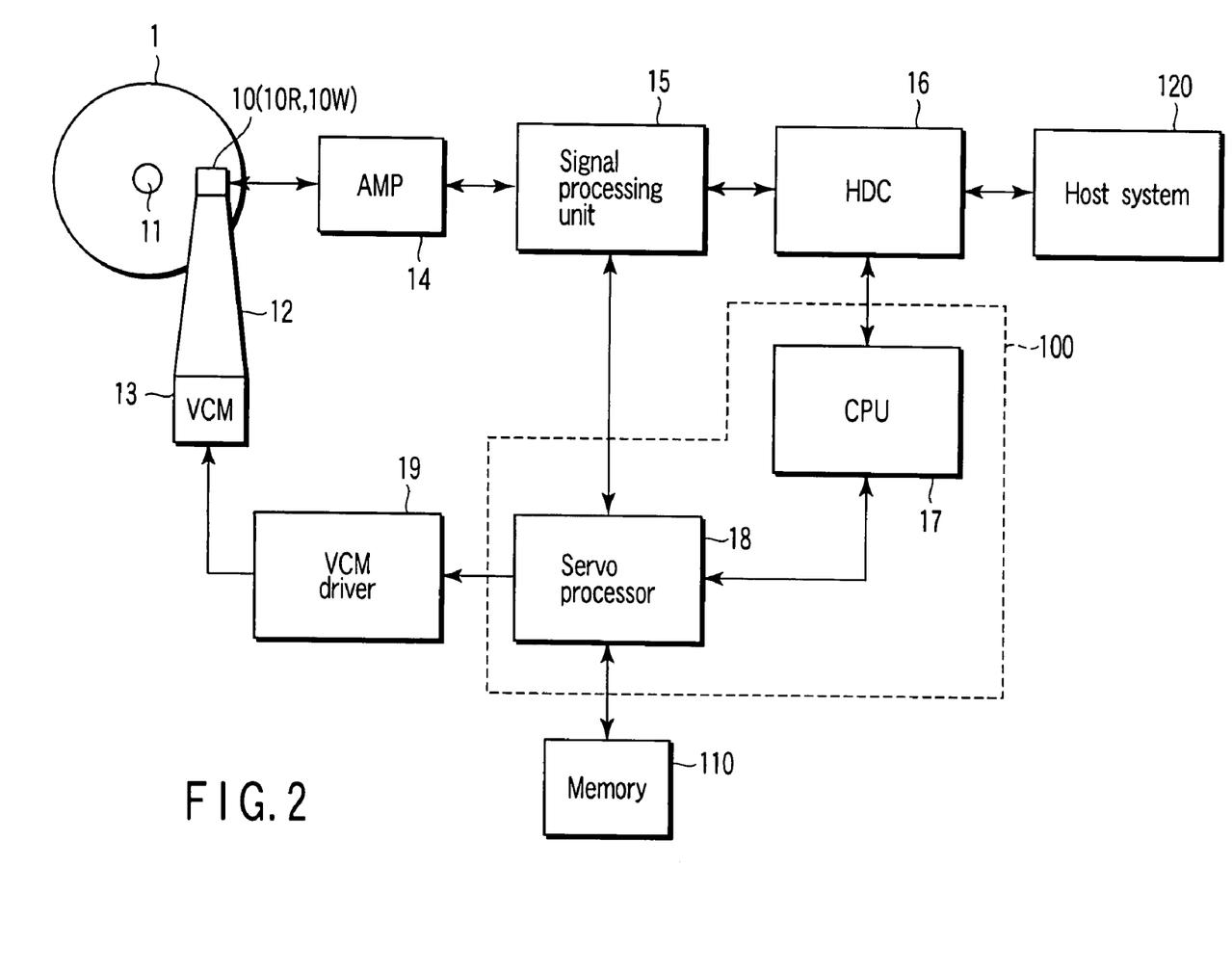
FIG. 2 is a block diagram illustrating a main part of a disk drive according to the first embodiment of the present invention.

FIG. 2 is a block diagram illustrating a main part of a disk drive adopting perpendicular magnetic recording according to the first embodiment of the present invention.

As shown in FIG. 2, the disk drive comprises a disk medium 1 that records data by perpendicular magnetic recording, a spindle motor 11 that rotates the disk medium 1, and an actuator 12 on which a head 10 is mounted. The head 10 has a read head 10R to read data (servo information or user data) from the disk medium 1, and a write head 10W to write user data on the disk medium 1. The actuator 12 moves the head 10, mounted on a distal end thereof, in a radial direction of the disk medium 1, by driving of a voice coil motor (VCM) 13.

Further, the disk drive has a preamplifier 14, a signal processing unit 15, a hard disk controller (HDC) 16, a microprocessor (CPU) 17, a servo processor 18, and a VCM driver 19.

The preamplifier 14 amplifies a read signal (servo information or user data) read by the read head 10R, and transmits the amplified read signal to the signal processing unit 15. Further, the preamplifier 14 amplifies a write signal output from the signal processing unit 15, and transmits the amplified write signal to the write head. The signal processing unit 15 is a read/write channel that processes read/write signals, and has a function of playing back servo information from a read signal. Further, the signal processing unit 15 plays back user data from a read signal and transmits it to the disk controller 16.

The disk controller 16 serves as an interface between the drive and a host system 120, and performs data transfer control of read/write data (user data) and the like. The CPU 17 is a main control device of the drive, and performs control of read/write operation and the like.

The disk drive of the first embodiment has the servo processor 18 to perform servo control processing, in addition to the CPU 17. The servo processor 18 is specifically formed of a digital signal processor (DSP) and a logic circuit. The servo processor 18 drives and controls the actuator 12 through the VCM driver 19, on the basis of the servo information played back by the signal processing unit 15, and performs positioning control of the head 10. The servo processor 18 performs positioning control of the head 10, using various control information stored in an internal memory (flash EEPROM) 110.

The CPU 17 and the servo processor 18 may not be separate units, but may be formed of a microprocessor 100 that runs software programs which achieve their functions. Specifically, the servo processor 18 may be a software program that achieves servo control processing.

(Disk Medium)

As shown in FIG. 1, the disk medium 1 of the first embodiment is a medium used for perpendicular magnetic recording and having a DTM structure. The disk medium 1 comprises a servo region 2 and a data track portion 3, in each of which magnetism is divided into magnetic portions and non-magnetic portions. The non-magnetic portions are regions where, for example, silicon oxide ($SiO_2$) is embedded and flattened.

As shown in FIG. 1, the servo region 2 is provided with, as servo information, a preamble portion 20 for timing synchronization, a cylinder address code section 21 recording a cylinder code and the like to identify a cylinder (track), a phase-difference servo burst pattern section 22, and a post amble (PAD) serving as a measure against influence of disk eccentricity (fluctuations in rotation). Specifically, the medium is provided with the servo region 2 in which the servo information is embedding-recorded by the DTR method.

The servo regions 2 are circumferentially arranged at regular intervals on the disk medium 1, as shown in FIG. 1. Further, servo tracks each including the servo region 2 and the data track 30 are arranged at predetermined track pitch (servo pitch) Tp intervals within a range from the internal periphery side to the external periphery side. Different cylinder codes are assigned to the respective servo tracks by the cylinder address code section 21.

The phase-difference servo burst pattern section 22 records a servo burst pattern having a single inclination direction (hereinafter referred to as "inclined burst pattern") and formed of a magnetic portion in which magnetism is provided in a uniform direction (for example, the N pole). The inclined burst pattern has a structure in which a phase of the inclination direction gradually delays toward the internal periphery, and gradually advances toward the external periphery. The inclined burst pattern is information used for detecting the offtrack amount (position error with respect to the center line Tc) of the read head 10R.

In FIG. 1, the reference symbol Tc represents a radial position where the phase difference of the inclined burst pattern is 0, that is, the center line of the servo tracks. The inclined burst pattern is a pattern which is repeated with cycles of 2 servo pitches. Further, the reference symbol Tc represents a radial position where recording is performed with a phase and a frequency which completely agree to those of 1, 0 (non-magnetic, magnetic) of the preamble section 20. The PAD also has the same phase as that of the preamble portion 20. The radial position where the phase difference of the inclined burst is 0 is disposed in the center of each servo track.

(Inline Angle of the Head)

Next, explained is the inline angle of the head 10, which relates to the advantageous effect of the first embodiment.

On the disk medium 1 of the first embodiment, an inclined burst pattern is embedding-recorded by the DTR method on the phase-difference servo burst pattern section 22 included in the servo information, to detect the offtrack amount (position error with respect to the center line Tc) of the read head 10R. The inclined burst pattern has a pattern structure of a single-inclined direction, in which a phase of the inclination direction gradually delays toward the internal periphery and gradually advances toward the external periphery, as shown in FIG. 1. The pattern structure having a single inclined direction is set in connection with the inline angle which the mechanism of the head 10 and the actuator 12 have in the disk drive, as described later.

Figure 3:
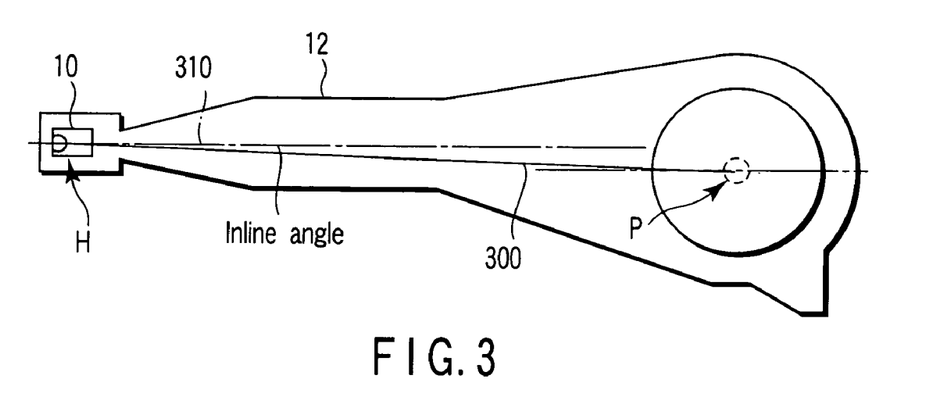
FIG. 3 is a diagram illustrating an inline angle of a head according to the first embodiment of the present invention.

As shown in FIG. 3, a straight line 300 connecting a rotation center P of the actuator 12 and the head 10 has a certain angle with an attaching line 310 of the head 10. This difference in angle is referred to as an inline angle, which corresponds to a head inclination angle. Generally, a slider of the head 10 is horizontally attached onto a suspension beam mounted on the actuator 12. However, the rotation center P of the actuator 12 is set to a position which is offset from the attaching line 310 of the head 10.

Figure 4:
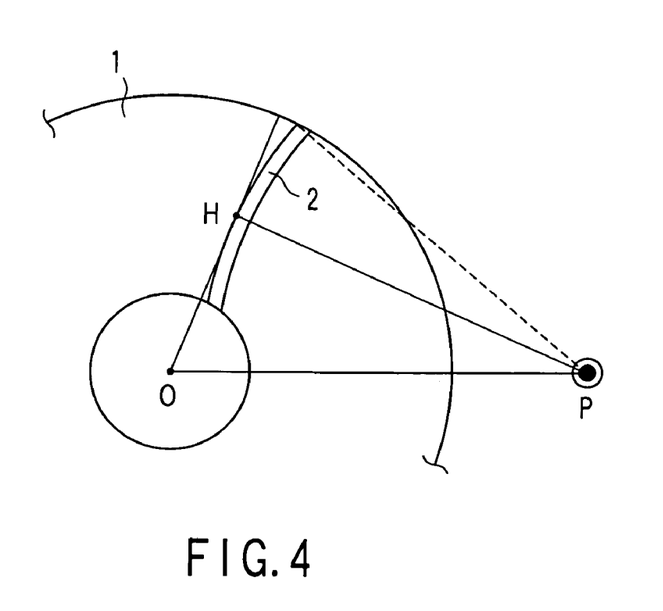
FIG. 4 is a diagram illustrating an access angle of the head according to the first embodiment of the present invention.

On the other hand, FIG. 4 is a diagram illustrating an access angle of the head 10 (whose position is represented by reference symbol H). Specifically, the access angle of the head with respect to the circumferential direction of the disk medium 1 is also called skew angle. Since the head is rotated (around the rotation center P) by the actuator 12, and access angle varies between the internal periphery and the external periphery of the disk medium 1. Therefore, the servo information recorded in the servo region 2 is recorded as a pattern which follows a head access locus according to the skew angle, as shown in FIG. 4. In FIG. 4, reference symbol 0 represents a rotation center of the disk medium 1.

Specifically, it is structured such that radial lines of the preamble section 20 for timing synchronization and the address section 21 in the servo region 2 have varying inclined angles according to a circumferential tangent and a position of the radius. This means that an angle between the inclined burst pattern with a radial line (line in a direction where the preamble continues) does not change, substantially maintaining the inline angle, although the head access angle with respect to the circumferential direction changes. In other words, the inclined state of the pattern of the preamble section 20 varies between the internal periphery and the external periphery, the head 10 performs access to the pattern while inclined by the inline angle with respect to the pattern, regardless of whether it is located near the internal periphery or the external periphery.

As described above, if the head 10 inclines by the inline angle with respect to the pattern of the servo information, there are cases where the same property cannot be obtained, according to the inclined state of the servo burst pattern of single inclination. Specifically, the inclined direction of the inclined burst pattern causes difference in signal quality of a playback signal (servo signal) played back by the read head 10R.

(Relationship Between the Inclined Burst Pattern and the Inline Angle)

Next, explained is relationship between the inclined burst pattern and the inline angle, with reference to FIG. 5, FIG. 6, and FIGS. 7A to 7D.

Figure 7A:
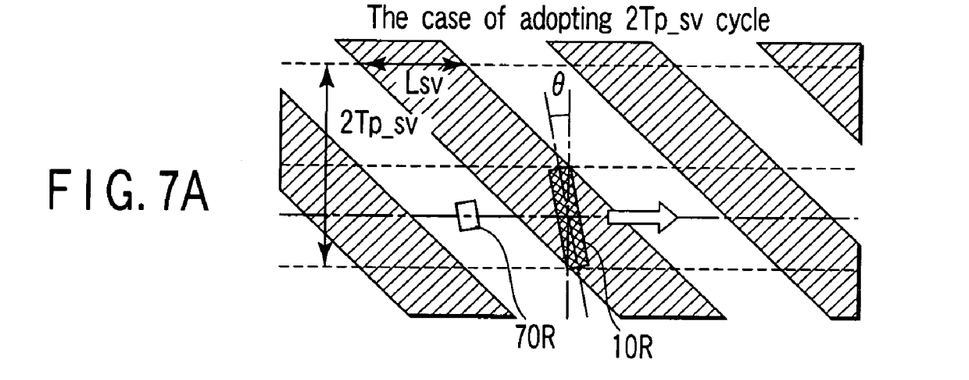
FIGS. 7A to 7D are diagrams illustrating a relationship between a cycle of the phase-difference servo burst pattern and a detection accuracy according to the first embodiment of the present invention.

FIG. 7A illustrates a structure of an inclined burst pattern of the first embodiment, in which a phase of the pattern inclined direction gradually delays toward the internal periphery, and gradually advances toward the external periphery, with 2Tp_sv cycles. Specifically, the pattern inclined direction is set in the inline angle direction of the head. In FIG. 7A, a common read head 70R having a narrower playback head width is shown, in comparison with the read head 10R of the present invention with a wider playback head width, which is adopted in the DTR method. On the other hand, FIG. 7C illustrates a structure of an inclined burst pattern, wherein the phase gradually delays in a position opposite to the inclined burst pattern of the present invention, that is, toward the external periphery.

Figure 7B:
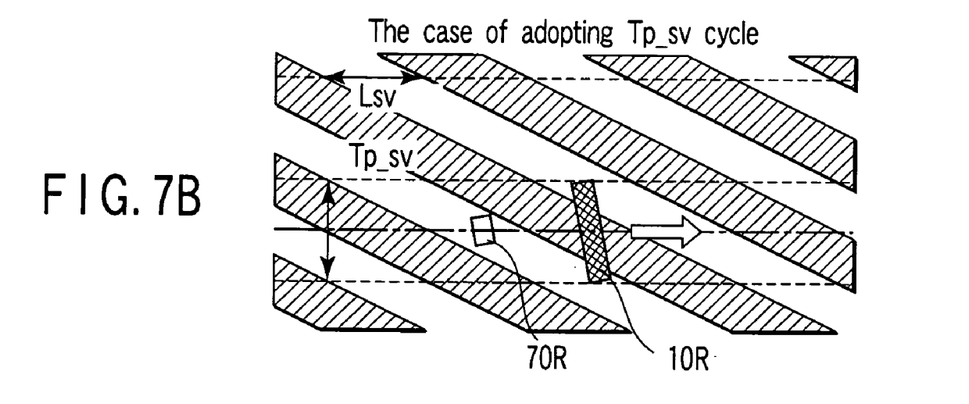
Figure 7C:
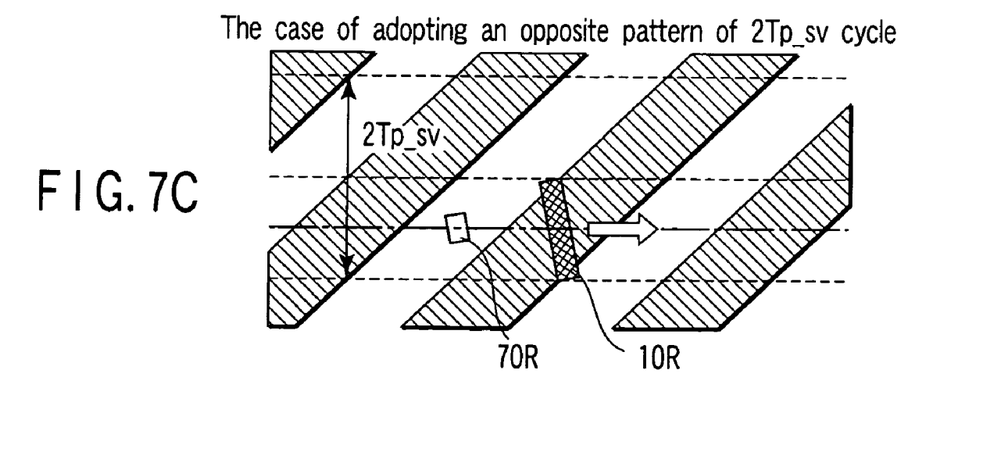
Figure 7D:
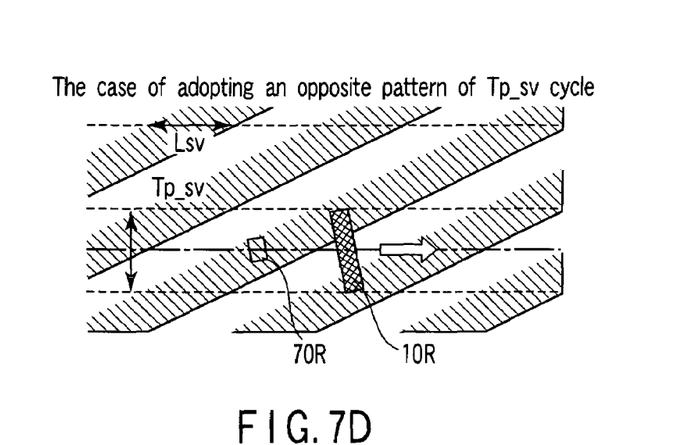

FIGS. 7B and 7D illustrate a structure of an inclined burst pattern obtained by inclining the pattern inclined direction in the inline angle direction, and a structure of an inclined burst pattern in which the phase gradually delays toward a position opposite to the inclined burst pattern, that is, the external direction, respectively. Both the structures have a Tp_sv cycle. Specifically, FIG. 7B illustrates an inclined burst pattern inclined in the inline angle direction.

As shown in FIGS. 7A to 7C, the common read head 70R having a narrower playback head width is completely buried in the patterns other than the inclined burst pattern shown in FIG. 7D. The common read head 70R may be buried even in the inclined burst pattern shown in FIG. 7D, if the designs of Lsv and Tpsv are slightly different. This shows that, in the case of using the common read head 70R having a narrower playback head width, the accuracy in phase detection does not extremely deteriorate in any burst pattern, unless the burst pattern is extremely inclined.

On the other hand, the read head 10R the present invention adopted in the DTR method and having a wider playback head width is not completely buried in the patterns, except the inclined burst pattern illustrated in FIG. 7A. In the inclined pattern illustrated in FIG. 7C, the read head 10R is considerably buried, which does not seem to cause much problem. However, actually, as described later with reference to FIGS. 5 and 6, the case of FIG. 7C causes a large difference in a simulation result due to factors such as unevenness in the burst line width.

Figure 5:
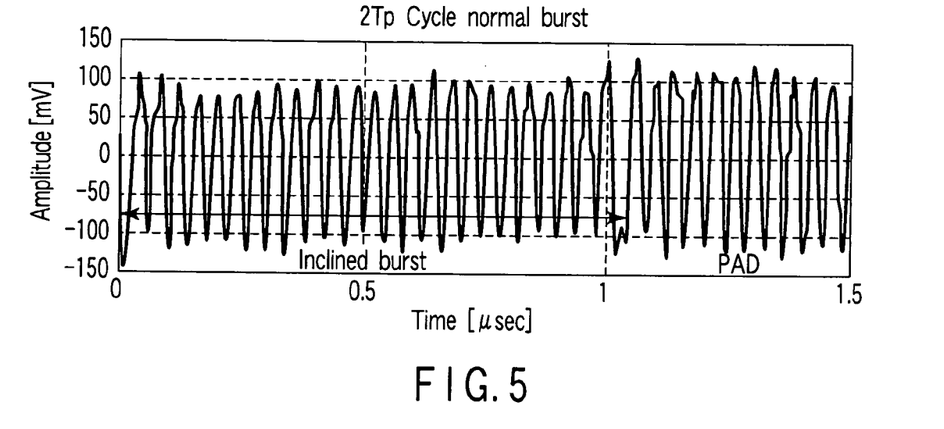
FIG. 5 is a diagram illustrating a simulation result based on an inclination direction of a phase-difference servo burst pattern according to the first embodiment of the present invention.
Figure 6:
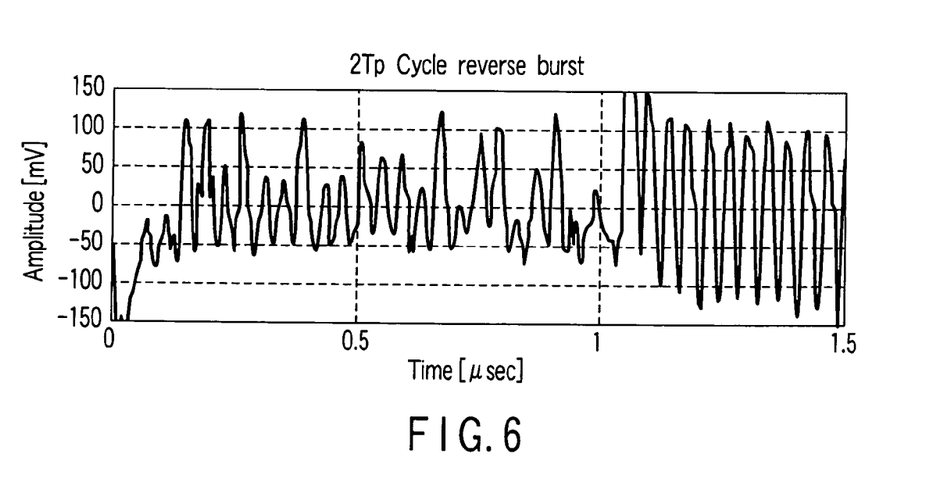
FIG. 6 is a diagram illustrating another simulation result based on the inclination direction of the phase servo burst pattern according to the first embodiment of the present invention.

FIGS. 5 and 6 illustrate simulation results of a playback signal in the case where an inclined burst pattern is played back by the read head 10R. The inclined burst pattern is a pattern of 2Tp_sv cycles, and has 10% fluctuations in the pattern line width. Further, the inline angle of the head is 7.5 deg. The playback signal amplitude of the inclined burst pattern is extremely easily distorted by influence of noises such as fluctuations in pattern width, and a large difference is caused in signal amplitude.

FIG. 5 illustrates a simulation result of a playback signal in a pattern inclined in the same direction as that of the inclined burst pattern of the first embodiment. FIG. 6 illustrates a simulation result of a playback signal in a pattern inclined in a direction opposite to that of the inclined burst pattern of the first embodiment.

As shown in FIG. 5, a playback signal of the inclined burst pattern of the first embodiment, which is inclined in consideration of the inline angle of the head displays stable signal amplitude property. In comparison with this, in the case of using a playback signal in a pattern inclined in a direction opposite to that of the inclined burst pattern of the first embodiment, its signal amplitude extremely decreases and is greatly disordered due to assumed random jitter disturbance, as shown in FIG. 6.

The reason why the signal amplitude decreases as shown in FIG. 6 is a high parallelism between the head width direction line of the read head 10R and the inclined direction line of the inclined burst pattern. As the more parallel they are, the greater the amplitude becomes. Further, the reason why the signal amplitude is greatly disordered is that the read head 10R is almost buried in the pattern as shown in FIG. 7C, although it is not completely buried. Therefore, fluctuations in the pattern width causes states where the head is completely buried and states where the head is not much buried, and this is noticeably displayed as fluctuations in amplitude. Therefore, inclining the inclined burst pattern in conformity with the direction of the inline angle is very effective for improving the accuracy in detecting the position of the read head 10R from the inclined burst pattern.

Next, explained is relationship between the angle of the inclined burst pattern and the offtrack detection accuracy, with reference to FIGS. 7A to 7D and FIG. 11.

Figure 11:
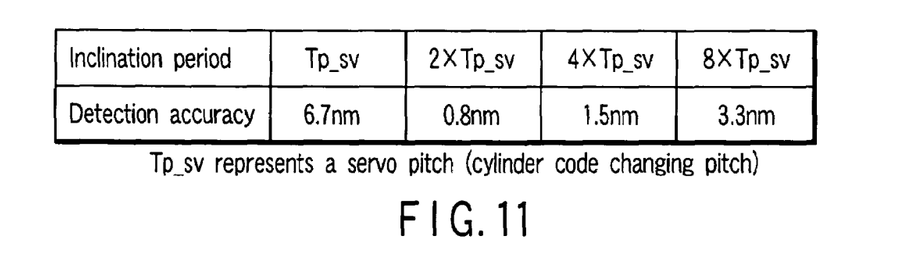
FIG. 11 is a diagram illustrating a relationship between an angle of an inclined burst pattern and an offtrack detection accuracy according to the first embodiment of the present invention.

FIG. 11 illustrates a result of investigating the offtrack detection accuracy, by setting the inclined burst pattern, that is, the inclined direction of the first embodiment in the inline angle direction of the head, and varying the radial cycle of the inclined burst pattern. In FIG. 11, the cycle of the inclined burst pattern indicates the difference in angle of the inclined burst pattern with respect to the head.

As shown in FIG. 11, in the case of setting the cycle of the inclined burst pattern of 2 Tp_sv or more, the detection accuracy is almost proportional to the cycle of the inclined burst pattern. However, in the case of setting the cycle of the inclined servo burst pattern to the servo pitch (Tp_sv), suddenly the detection accuracy extremely deteriorates. This seems to be because the inclined cycle of the head with respect to the inclined burst pattern becomes too large, a plurality of types of signals are mixed within the detection sensitivity range (detection window) by the gap of the read head 10R, and thus the playback signal amplitude becomes extremely small. FIGS. 7A to 7D illustrate images thereof.

Supposing that the detection sensitivity range of the read head 10R is a square sensitivity range formed by the gap and the playback head width M, with the cycle of 2×Tp_sv, the N pole and S pole of perpendicular magnetism are completely included, and the maximum and minimum of the playback signal are obtained. On the other hand, with the cycle of Tp_sv, the N and S poles exist together within the sensitivity range of the read head 10R, and the signal amplitude obtained as an integral value thereof hardly changes even when the read head is moved in the circumferential direction.

In view of the above, to prevent existence of a plurality of types of signals in the detection sensitivity range of the read head 10R, the inclined burst pattern preferably has a structure as shown in FIG. 7A. Specifically, the inclined burst pattern as shown in FIG. 7A is designed on the basis of the shape of the read head 10R, the inline angle (θ of FIG. 7A) of the head, the servo pitch (Tp_sv), and a servo pattern circumferential length (Lsv of FIGS. 7A to 7D) determined by the servo signal recording cycle, the medium rotation speed and the radius position. Specifically, the inclined burst pattern should be designed with the lower limit of the cycle of the inclined burst pattern, at which the N and S poles do not exist together and interfere directly under the shape of the read head 10R at the radius of the innermost periphery where the circumferential length of the servo burst pattern is the shortest.

Actually, the head 10 including the read head 10R is attached to the actuator 12 being the rotation drive system, and thus the skew angle changes according to the radius position on the disk medium 1. However, the head 10 makes access while inclined by the inline angle with respect to the inclined burst pattern, regardless of whether the head 10 is located near the internal periphery or the external periphery, and thus causes no problems.

In the first embodiment, setting the cycle of the inclined burst pattern to 1.8 servo pitches or more prevents occurrence of interference. For example, the cycle of the inclined burst pattern is preferably set to 2 servo pitches, at which good offtrack detection accuracy is achieved.

(Explanation of a Method of Detecting Offtrack Amount)

Figure 8:
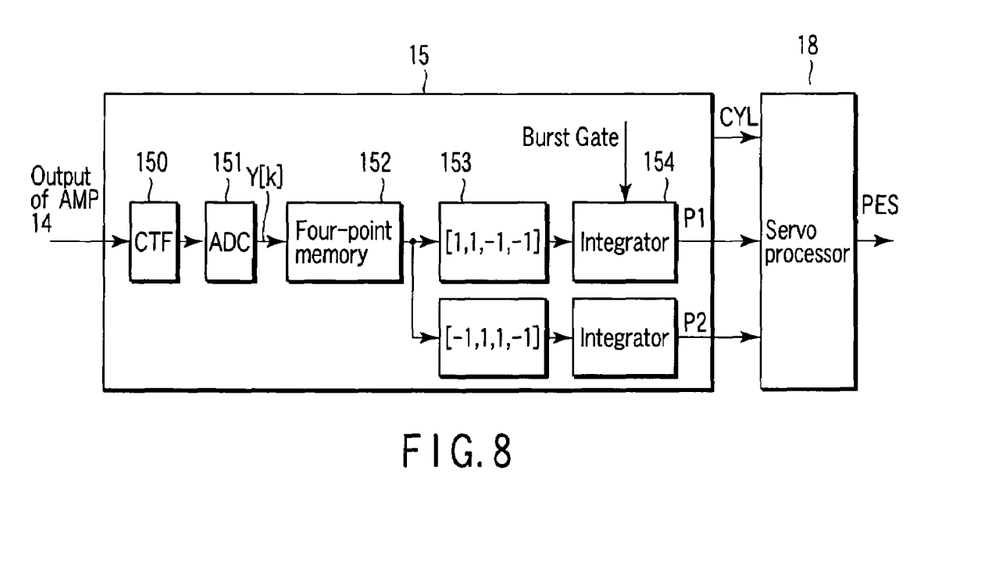
FIG. 8 is a diagram illustrating a structure of a signal processing unit according to the first embodiment of the present invention.

FIG. 8 is a block diagram illustrating an internal structure of the signal processing unit (read/write channel) 15, and illustrates a signal detection system for the phase-difference servo burst pattern of the first embodiment. The read/write channel 15 obtains a cylinder code value CLY and phase-difference detection values P1 and P2, on the basis of a playback signal (output of the preamplifier 14) played back from the servo region 2 by the read head 10R, and outputs them to the servo processor 18. The servo processor 18 calculates an offtrack detection value (position error PES) of the read head 10R, on the basis of the phase-difference detection values P1 and P2.

When a playback signal output from the preamplifier 14 is input to the read/write channel 15, the timing synchronization circuit 150 generates a timing cycle signal in synchronization with the preamble, and the A/D converter 150 samples the playback signal and converts the signal into a digital value. An inclined burst playback signal SIG (θ) is represented by the following expression (1).

$$SIG(\theta)=A\sin(\theta+\phi) \qquad (1)$$

The read/write channel 15 performs orthogonal wave detection by means of FIR (finite impulse response) calculation (addition), by multiplying coefficients corresponding to a sine value and a cosine value of the playback signal, by the memory 152, the calculation elements 153 and the integrator 154. Specifically, in the orthogonal wave detection, calculation shown by the following expressions (2) and (3) is performed.

$$\int_0^{2\pi}\{\sin\theta\cdot SIG\}d\theta=\pi A\cos\phi \qquad (2)$$

$$\int_0^{2\pi}\{-\cos\theta\cdot SIG\}d\theta=\pi A\sin\phi \qquad (3)$$

The read/write channel 15 outputs sine and cosine components (proportional multiplied values of sin Φ and cos Φ) of the inclined burst playback signal, having the phase difference Φ with the phase-difference detection values P1 and P2, as shown in the following expressions (4) and (5) on the basis of the orthogonal wave detection result.

$$P1=2\sqrt{2}kA\cos\phi \qquad (4)$$

$$P2=2\sqrt{2}kA\sin\phi \qquad (5)$$

In this process, the phase angle Φ is calculated by arc tangent processing (a tan(P2/P1)). The arc tangent processing has an output of a range from −90 deg to +90 deg. In the first embodiment, the inclined burst pattern is formed with the cycle of 2 servo pitches, and thus the offtrack amount is obtained by simply subjecting it to proportional multiplication.

Figure 9A:
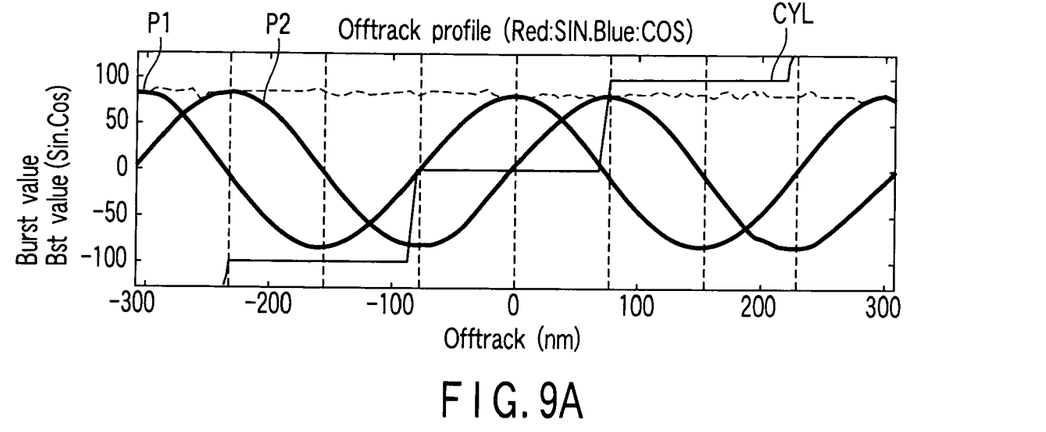
FIGS. 9A and 9B are diagrams illustrating an offtrack detection value according to the first embodiment of the present invention.
Figure 9B:
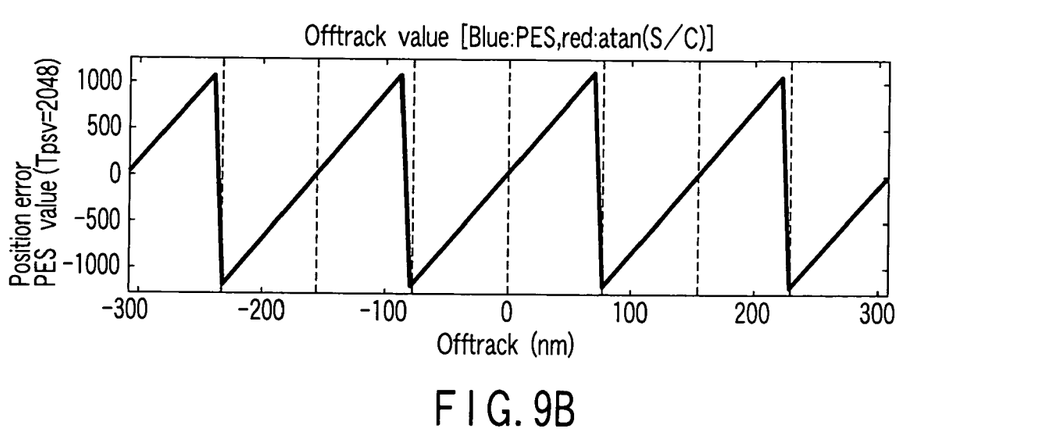

FIG. 9A is a diagram illustrating characteristics of output signals P1 and P2 of the read/write channel 15 at the cycle of 2 servo pitches. FIG. 9B is a diagram illustrating characteristics of an offtrack detected value PES.

Actually, there is an influence of noises on the cylinder address code in the cylinder code changing boundaries and P1 and P2, it is required to perform correction in the arc tangent processing boundaries, to prevent discontinuous hops of the head position.

When the head position Pos is expressed by the cylinder code value Cyl and the offtrack amount Offtrk, the following expression (6) is obtained.

$$Pos = G*Cyl + Offtrk \quad (6)$$

G represents an offtrack amount corresponding to one cylinder. In the vicinity of the value where the phase angle $\Phi$ is 90°, the offtrack amount Offtrk has a value of $-G/2$ or $G/2$. However, the cylinder code value Cyl is changed with the change of quadrants, the continuity of the head position Pos is maintained. The continuity of the head position Pos is easily secured, by correcting the cylinder code value Cyl to satisfy the quadrant, on the basis of the sign (plus and minus) of the output signal P1 of the read/write channel 15.

In view of the above processing, it is desirable to use a burst pattern whose offtrack amount from the track center, where the phase angle $\Phi$ corresponds to the cylinder code, is 0° or 180° in the center of the cylinder which can be easily determined. Therefore, the radius position where the burst pattern has the same phase (has the same timing) as that of the preamble section 20 is set to be almost the center of the same cylinder code, such that the cycle of the inclined burst pattern is 2 servo pitches.

As described above, if there are noises, the phase angle suddenly changes in the vicinity of the arc tangent processing. Therefore, the cylinder code value Cyl is corrected on the basis of the sign (plus and minus) of the output signal P1 of the read/write channel 15, and thereby the continuity of the head position Pos is secured. However, in this correction, if the quadrants whose phases are different due to the plus and minus of P1 are classified into two quadrants, the cylinder code information is corrected by using the quadrant information. Specifically, the quadrant where the phase difference exists is determined on the basis of the size relationship of the sine and cosine value information of the inclined burst pattern output from the channel 15, and then the cylinder code information of the quadrant is corrected.

Second Embodiment

Figure 10A:
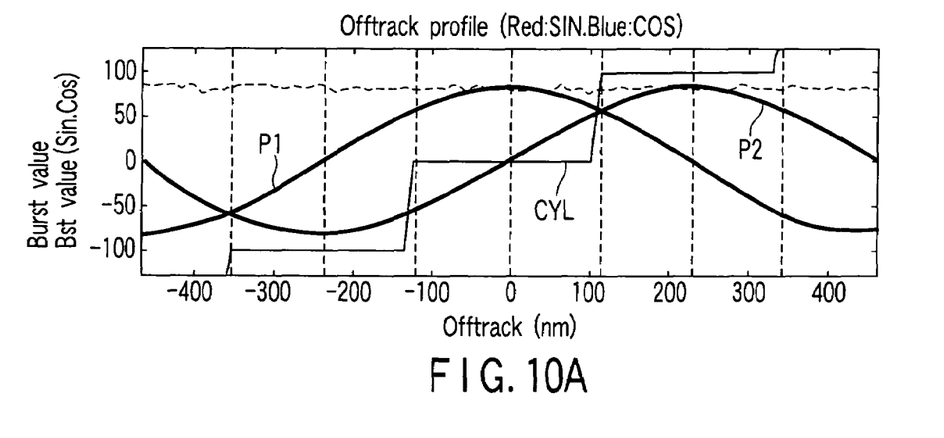
FIGS. 10A and 10B are diagrams illustrating an offtrack detection value according to a second embodiment of the present invention.
Figure 10B:
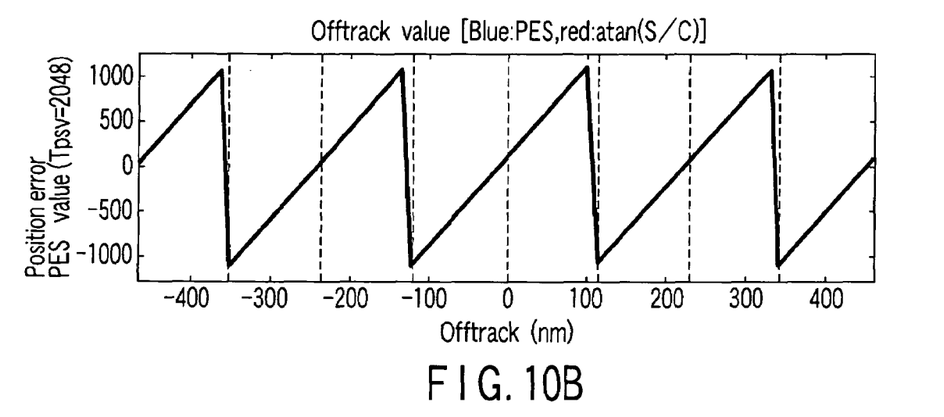

FIGS. 10A and 10B correspond to FIGS. 9A and 9B. FIGS. 10A and 10B are diagrams illustrating characteristics of the phase-difference detection values P1 and P2, which are outputs of the read-write channel 15 for an inclined burst pattern at a cycle of 4 servo pitches, and an offtrack detection value (position error PES) of the read head 10R, according to a second embodiment of the present invention.

Specifically, the second embodiment relates to a structure of an inclined burst pattern similar to the first embodiment, except that the cycle is 4 servo pitches. Therefore, the structures of a disk drive and a disk medium 1 of the second embodiment other than an offtrack detection method using an inclined burst pattern having a cycle of 4 servo pitches described below are the same as those of the first embodiment, and detailed explanations thereof are omitted.

In the second embodiment, supposed is the case where the inline angle of the head is 10 deg or more. In the DTR method, the playback head width of the read head 10R is as wide as the data track pitch. Therefore, if the inclined burst pattern has 2 servo track pitches, the sensitivity range of the head is not properly buried in the inclined burst pattern, and thus the signal amplitude deteriorates.

Further, in the second embodiment, the inline angle has a large value of 10 deg or more, it is highly possible that an inclined burst pattern of a cycle of 2 servo pitches cannot obtain a sufficient head-position detection accuracy. Therefore, the second embodiment has a structure adopting the cycle of the inclined burst pattern of 4 servo pitches, aiming at improving the detection accuracy for the offtrack position.

(Offtrack Detection Method)

As shown in FIG. 10A, for each 90 degree from $-45°$ to $45°$ phase, the cosine value P1 and the sine value P2 change over 4 cylinders. Then, the event is divided into 4 quadrants on the basis of the size relationship of their absolute values and the signs (plus and minus) of P1 and P2. Specifically, First quadrant: $|P1| \geq |P2|$ & $P1>0 \rightarrow -45$ deg$<\Phi<+45$ deg Second quadrant: $|P1|<|P2|$ & $P2>0 \rightarrow +45$ deg$<\Phi<135$ deg Third quadrant: $|P1| \geq |P2|$ & $P1<0 \rightarrow 135$ deg$<\Phi<225$ deg Fourth quadrant: $|P1|<|P2|$ & $P2<0 \rightarrow 225$ deg$<\Phi<315$ deg In the odd-number quadrants (first and third quadrants), P1 never becomes 0. However, since there is a high risk that P2 becomes 0, the arc tangent processing (a tan(P2/P1)) is performed to obtain a phase angle almost ranging from $-45$ deg to $+45$ deg. Further, in the even-number quadrants (second and fourth quadrants), the arc tangent processing (a tan($-$P2/P1)) by inverting the denominator and the numerator to obtain a phase angle almost ranging from $-45$ deg to $+45$ deg. The offtrack amount is obtained by subjecting the phase angle to proportional multiplication. Further, the lower 2 bits of the cylinder address correspond to the quadrant value. Although the offtrack value greatly changes when the quadrants are changed, it is determined from the quadrant whether the offtrack value is plus or minus.

In the second embodiment, the zero phase of the inclined burst pattern is located in the center of the 4 k cylinder of the cylinder code value Cyl. Therefore, in the case of the first quadrant, by changing the lower 2 bits of the cylinder code value Cyl to correspond to the quadrant value $-1$, the head position Pos including the cylinder code value Cyl maintains continuity, and does not become discontinuous.

As described above, the quadrant including the burst phase difference is determined on the basis of the size relationship of the sine and cosine value information (P1 and P2) of the phase-difference burst pattern output from the channel 15. The cylinder code information output from the channel is corrected by using the obtained quadrant information, and thereby simple processing is achieved to maintain the continuity of the head position. Therefore, even in the second embodiment adopting 4 servo pitches, the offtrack amount is easily calculated if the pattern has 0° in the center of the cylinder.

As described above, if the inclined burst patterns of the first and second embodiments having 2 servo pitches or 4 servo pitches have a structure wherein the inclined direction delays in the internal periphery and advances in the external periphery as shown in FIG. 1, the amplitude characteristic of a playback signal output from the read head 10R is stable, and a high offtrack detection accuracy is achieved. In comparison with this, as is clear from FIG. 6, in the case of an inclined burst pattern which has an opposite direction to the embodiments and a phase gradually delaying toward the external periphery, the signal amplitude of a playback signal output from the read head 10R is extremely unstable and small.

Further, as is clear from FIG. 11, due to the relationship between the inclination angle of the burst pattern and the detection accuracy, the offtrack detection accuracy increases as the inclined pattern cycle length becomes shorter and the inclination angle becomes larger, as long as the servo recording specification is the same. Strictly speaking, the relationship between the inclination angle of the burst pattern and the detection accuracy means the relationship between the inclined pattern repeating cycle and the offtrack detection accuracy, in the case of adopting a wide read head 10R for DTR in an inclined burst pattern which gradually delays toward the internal periphery.

According to the first and second embodiments, in a disk drive using a disk medium in which servo information is embedding-recorded by the DTR method, a high position detection accuracy is secured in detecting the position error of the head by the phase-difference servo burst pattern, even in the case where the playback head width of the read head is almost equal to the data track pitch.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A disk drive comprising:
   a magnetic disk medium including servo regions, in which servo information for position detection of a head performing recording and playback of user data is embedding-recorded by discrete track recording method, the servo information including a preamble section, a cylinder address code section, and phase-difference burst pattern sections to detect an offtrack amount, one phase-difference servo burst pattern section being provided in each of the servo regions, a servo burst pattern having an inclined direction corresponding to a direction of an inline angle of the head and a phase which gradually delays toward an internal periphery of the disk medium and gradually advances towards an external periphery of the disk medium;
   a read head which is included in the head and reads the servo information and the user data from the magnetic disk medium; and
   control means for performing positioning control of the head in accordance with the servo information played back from the servo regions by using the read head.

2. The disk drive according to claim 1, wherein
the servo burst pattern of the phase-difference servo burst pattern section in the magnetic disk medium is formed such that a radius position having the same phase as a phase of the preamble section is in almost the center of the same cylinder code in the cylinder address code section.

3. The disk drive according to claim 1, wherein
the servo burst pattern of the phase-difference servo burst pattern section in the magnetic disk medium has an inclined cycle of phase difference which is 2 or 4 times as wide as a servo pitch, and which allows a shadow of a detection range of the read head to be completely buried in the servo burst pattern when the detection range of the read head is projected onto the magnetic disk medium.

4. The disk drive according to claim 1, wherein
the magnetic disk medium records the servo information and the user data by perpendicular magnetic recording.

5. A magnetic disk medium being incorporated in a disk drive having a read head to read servo information and user data, the magnetic disk medium comprising:
   servo regions, in which the servo information for position detection of the read head is embedding-recorded by discrete track recording method,
   the servo information including a preamble section, a cylinder address code section, and phase-difference burst pattern sections to detect an offtrack amount,
   one phase-difference servo burst pattern section being provided in each of the servo regions, the servo burst pattern having an inclined direction corresponding to a direction of an inline angle of the head and a phase which gradually delays toward an internal periphery of the disk medium and gradually advances towards an external periphery of the disk medium.

6. The magnetic disk medium according to claim 5, wherein
the servo burst pattern of the phase-difference servo burst pattern section in the magnetic disk medium is formed such that a radius position having the same phase as a phase of the preamble section is in almost the center of the same cylinder code in the cylinder address code section.

7. The magnetic disk medium according to claim 5, wherein
the servo burst pattern of the phase-difference servo burst pattern section has an inclined cycle of phase difference which is 2 or 4 times as wide as a servo pitch, and which allows a shadow of a detection range of the read head to be completely buried in the servo burst pattern when the detection range of the read head is projected onto the magnetic disk medium.

8. The magnetic disk medium according to claim 5, wherein
the magnetic disk medium records the servo information and the user data by perpendicular magnetic recording.

* * * * *